United States Patent [19]

Smith et al.

[11] 3,832,455

[45] Aug. 27, 1974

[54] PREPARATION OF ZINC FERRITE YELLOW PIGMENTS

[75] Inventors: George B. Smith, Sycamore; Kent A. Orlandini, West Chicago, both of Ill.

[73] Assignee: George B. Smith Laboratories, Sycamore, Ill.

[22] Filed: Oct. 25, 1972

[21] Appl. No.: 300,847

[52] U.S. Cl. .............................. 423/594, 106/304
[51] Int. Cl. ............................................ C01g 49/00
[58] Field of Search ................................ 423/594

[56] References Cited
UNITED STATES PATENTS

| | | | |
|---|---|---|---|
| 2,904,395 | 9/1959 | Downs et al. | 423/594 |
| 3,428,416 | 2/1969 | Gie et al. | 423/594 |
| 3,438,723 | 4/1969 | Peshini | 423/594 X |
| 3,549,315 | 12/1970 | Lester et al. | 423/594 |

OTHER PUBLICATIONS

Economos, "Journal of the American Ceramic Society," Vol. 38, No. 7, 1955, pp. 241–244.

*Primary Examiner*—Herbert T. Carter
*Attorney, Agent, or Firm*—Wallenstein, Spangenberg, Hattis & Strampel

[57] ABSTRACT

Preparation of so-called "tans" pigments, in the form of certain zinc ferrites of substantially nonmagnetic character, by, for example, aerating a mixture of an aqueous solution of ferrous sulfate with zinc oxide at a controlled pH and at somewhat elevated temperature, adding an alkali whereby to precipitate out hydrous ferric and zinc oxides, heating to effect coupling of said hydrous oxides, washing to effect removal of substantially all water-soluble salts which may be present, and then calcining at elevated temperatures.

18 Claims, No Drawings

PREPARATION OF ZINC FERRITE YELLOW PIGMENTS

This invention relates to the production of novel yellowish pigments, commonly known as "tans" which, in their particularly preferred embodiments, are characterized by exceptional heat resistance or stability at high temperatures.

Generally speaking, commercially available yellow pigments which have good heat resistance are chrome yellows (lead chromates) and various cadmium sulfides some of which contain selenium and mercury. While these types of pigments possess excellent color qualities, they are relatively expensive and, in addition, have the disadvantage of being toxic. This latter deficiency has more recently become the basis for legal restrictions on the usage thereof as pigments in consumer products such as paints, plastics, metal enamels and ceramic glazes, and the current trends are in the direction of prohibiting the use of such pigments, including the heat resistant yellow types, which incorporate heavy metals such as lead, cadmium or mercury, in consumer products.

Possible substitutes for the above pigments are the natural and pure synthetic, generally hydrated, iron oxides which are readily available as inexpensive yellow pigments having reasonably good tinctorial strength and possessing little or no toxic properties. However, commonly, the yellow color of the hydrated iron oxides rapidly becomes red or reddish brown or muddy when the pigments are exposed to temperatures in excess of about 350°F. This undesirable feature, thus, excludes both the natural and synthetic iron oxides from incorporation into most thermoplastics, hot melts, baked enamels and ceramic glazes.

The pigments of the present invention are in the form of zinc ferrites, and they are made by particular procedures, hereafter described in detail, as a result of which they not only have highly satisfactory color and tinctorial power but, in addition, they are characterized by heat stability at temperatures, in certain cases, as high as about 1800°F and, in some cases, even higher.

We are aware that it has heretofore been proposed to produce yellowish pigments or tans, and also reddish pigments, the tans being in the form of zinc ferrites, magnesium ferrites, and aluminum ferrites, reference being made to such patents as U.S. Pat. Nos. 2,255,607; 2,502,130; 2,618,571 and 2,904,395. Certain of said tans pigments, which have been produced and commercially marketed, possess desirable yellowish undertones and good tinctorial power. The best of them, however, so far as we are aware, deteriorate and lose their desirable color and/or tinctorial power at temperatures of the order of 1350° to 1400°F. This loss of desirable color and/or tinctorial power makes such heretofore produced tans products of little or no value for a variety of uses, such as in high temperature ceramics, where tinctorial stability of the pigments is required at temperatures as high as 1600°, 1700° and 1800°F or higher.

Pigments made in accordance with our invention are characterized not only by high heat tinctorial stability but, in addition, they have the advantages of being made from inexpensive starting materials of nontoxic character and by procedures which are relatively simple so that the production of our novel and improved tans pigments is achieved in a most economical manner.

The materials which are used in the production of the pigments pursuant to our invention include, by way of illustration, iron sulfates, and oxides or carbonates of zinc. While such materials have heretofore been disclosed for use and used in the production of the tans type of pigments, such as those of the zinc ferrite type, the overall procedures which we employ, and which are essential to the achievement of the production of our novel tans pigments, are neither disclosed nor suggested by the foregoing prior art patents nor by anything else of which we are aware.

In the production of the zinc ferrite pigments of our invention, it is especially advantageous initially to admix an aqueous zinc oxide slurry with an aqueous solution of copperas or ferrous sulfate, the proportions of the zinc oxide and the ferrous sulfate being so selected as to provide for, in the finished zinc ferrite pigment, a weight ratio of about 33 percent ZnO to about 67 percent $Fe_2O_3$, although variances in weight ratios in the finished pigments in the range of 30 to 35 percent ZnO to 70 to 65 percent $Fe_2O_3$ give reasonably satisfactory results. Zinc carbonate can be used in place of zinc oxide but zinc oxide is particularly satisfactory. The zinc ferrite pigments of the invention are characterized by high purity in the sense that they contain, calculated as oxides, of the order of 98 or 99 percent, or more, of $Fe_2O_3$ and ZnO, said oxides being appropriately bonded in the form of ferrites.

In the production of the novel pigments of the present invention, the aforesaid mixture of the zinc oxide slurry and ferrous sulfate solution is heated to a controlled temperature which, generally speaking, should not, at this stage, substantially exceed about 130°F and should not be substantially below about 115°F. Too high a temperature promotes the formation of undesirable magnetic oxides, and too low a temperature tends to produce certain ferric oxide hydrates of undesirable character. It is desirable, therefore, to maintain the mixture at about 115° to about 130°F, particularly about 120° to 125°F and to keep it well mixed. The said mixture is then oxidized by an oxygen-containing gas, most desirably by aeration or blowing air therethrough, and this is continued until all or essentially all of the ferrous iron is oxidized to ferric iron. Again, gaseous oxygen can be used in the oxidation but it is unduly costly, and air oxidation is especially advantageous for economic and handling reasons.

While, as pointed out above, the temperature must be controlled so as not to substantially exceed 130°F so as to avoid formation of undesirable magnetic oxides, it is in order to note that, in the latter part or near the end of the oxidation or aeration step, the temperature can be, and desirably is, raised, for instance, to about 140° or 150° F and, indeed, after the pH has reached about 7 to 7.5 by the addition of alkaline materials, the oxidation or aeration is desirably discontinued, at which time the oxidation to ferric iron has been essentially completed, and the temperature can then be raised to about 160° to 200°F, or up to about the boiling temperature of reaction mixture, advantageously about 180° to 200°F, in a final heating step, after which the zinc ferrite product is water-washed to free it of water-soluble salts and is then dried and calcined, for instance, in a muffle furnace or other calcining equipment. By the use of the more elevated temperatures, of about 140° to 150°F and about 200°F, at times or under conditions where formation of magnetic zinc ferrite is essentially avoided, coupling of the zinc oxide and ferric oxide is enhanced. While the pH is increased by the addition of alkaline material, after substantially all or most of the ferrous iron has been oxidized to ferric iron, which increase may be to pH 9.5 or even higher, it is desirable not to exceed a pH of 7.5 since the excess alkaline material is, in any event, required to be removed in the subsequent water-washing step.

During the oxidation step, the reaction mixture becomes more acidic. To control the pH to the desired extent, which is generally approximately 5 to 6, aqueous alkali, which may be sodium or potassium or ammonium hydroxide, or sodium or potassium carbonate, but is most desirably sodium hydroxide or caustic soda, or soda ash or sodium carbonate, is added during the oxidation step and, as noted above, the temperature is maintained most desirably in the range of about 120° to 135°F, particularly 120° to 125°F. The alkali utilized plays somewhat of a role with respect to the top temperature range at which the finished zinc ferrite maintains its stability. Thus, for instance, where ammonium hydroxide is used, temperature stability of the finished zinc ferrite may, in certain cases, be as much as about 100°F higher than where sodium carbonate is used as the neutralizing agent.

The addition of the alkali results in a rapid precipitation of the ferric iron in the form of a hydrous oxide which enters into an intimate association or combination with the zinc oxide. The continued heating of the precipitated mass promotes the association or combination and this is furthered upon drying or dehydration. Finally, the strong heating in the calcining step serves to enhance the intimacy of association or combination of the ferric and zinc oxides to produce the final pigment product which is then ground or pulverized to desired particle size.

As noted above, the iron component of the final pigment is utilized in the practice of the method of the present invention in the form of a water-soluble salt, namely, a ferrous sulfate salt, and it is essential that it be oxidized to ferric iron. However, in the broader aspects of this invention, it is not necessary to start with a ferrous salt or a ferrous salt alone. Thus, for instance, ferric sulfate or a mixture of ferric and ferrous sulfates can be used as starting materials. Such modified procedures commonly cause a slight variation in the shade of the finished tan pigment.

The following examples are illustrative, but in no way limitative, of the practice of the present invention. All temperatures recited are in degrees Fahrenheit.

EXAMPLE 1

30 g of zinc oxide (advantageously 325 mesh or lesser micron size) are slurried and thoroughly stirred into 1200 ml of water at 150°. To this slurry are added 200 g of copperas (30 percent $Fe_2O_3$) dissolved in 800 ml of water (60°). The temperature of the mixture drops to about 125°, is stirred for 20 minutes and brought to 130° to 135°. At this point aeration is begun. The pH is held at about 5 by addition of caustic soda solution (13 percent, 16°Be solution). When all or essentially all of the ferrous iron is oxidized to ferric iron, the pH does not tend to decrease, and addition of caustic soda solution is continued until the pH reaches about 8. The mix is then heated to 200° for 1 hour in order to assure coupling of the zinc hydroxide (hydrous zinc oxide) with the ferric oxide hydrate. The product is washed free of water-soluble salts (mainly sodium sulfate), and then calcined at 1300° to 1500° for 1 hour. The furnace product is pulverized to desired particle size. It contains approximately 33 percent zinc oxide by weight. It is a pigment having a yellowish undertone which is heat stable to a temperature up to and including that at which calcining step is carried out.

Observations

In the foregoing Example, the zinc oxide-copperas mixture assumes a pastel blue color until aeration is begun whereupon the color shifts rapidly to a dark blue aqua followed by a change toward a deep olive, then gradually shifting to a light olive brown and finally light shades of brown with yellowish tints. This color change depends on the oxidation of the ferrous iron and the subsequent hydrolysis of the latter to form ferric oxide hydrate at the stated pH of about 5. The rate of color change depends on the rate of oxygen input through aeration. When the color of the pot mixture approaches light browns, the ferrous iron is nearly oxidized and, as described, the caustic alkali is added until the pH reaches about 8, at which pH the pot mixture thickens and the solid phase occupies a volume of about 3 times the volume of the ferric oxide hydrate per se (without zinc oxide).

EXAMPLE 2

200 g of copperas (ferrous sulfate of 30 percent $Fe_2O_3$ content) is dissolved in about 2000 ml cool water. The copperas solution is then heated to 145° whereupon the heat is shut off and a slurry of 30 g zinc oxide in about 600 ml cool water is added to the heated copperas solution. The temperature is lowered to 120° to 125° and the batch is mixed thoroughly for 20 to 25 minutes. Then aeration is begun and continued until substantially all the ferrous ion is air-oxidized. During the air oxidation, acid is produced and an aqueous 20 percent sodium carbonate solution (23°Be) is added to control the pH. The pH is held in this way near a value of 5 (e.g. 4.9 to 5.3) until all of the ferrous iron is oxidized to ferric iron. The sodium carbonate also serves to neutralize and combine with the sulfate ion present from the copperas. The temperature is held at near 125° and less than 130° to avoid production of magnetic brown oxides which interfere with the oxidation of the ferrous iron. When all of the ferrous iron is oxidized, the pH of the batch will tend not to fall below 5. This point is also approximately equal to the utilization of a total of 300 ml of 23° Be sodium carbonate solution added to the above batch during the aeration. Near the end of the aeration step, the heat can be turned up to 150° and kept there to the completion of the aeration to remove all traces of the ferrous iron, the sodium carbonate solution being added slowly to keep the pH up to nearly 6. When about 400 to 410 ml of the sodium carbonate solution have been added the pH will have reached 7 or 7.5. The heat is turned up at this point to 200° and held there for 1 hour. The aeration can be shut down before the final heating at 200°. The pH may fall somewhat during the final heating and can be raised by additional sodium carbonate solution to maintain the pH at 7.5 or 8. The batch is then finished and the zinc ferrite product ($\approx$ 33 percent ZnO by weight) is washed free of water-soluble, mainly sodium sulfate, salts. The product is then dried and calcined at 1800° for one-half hour. The resulting finished tan product is then pulverized to a desired particle size.

The following Example utilizes the precipitation of ferricferrous hydroxide and zinc hydroxide with an aqueous solution of soda ash. The desired color, proper particle size and mass tone of the final products result from the combination of steps employed, including the calcination at 1800°. In the Example, the ferricferrous sulfate was derived from a converted magnetite ore (e.g. Cedar City Magnetite), made by reacting the magnetite with an excess over stoichiometric proportions of sulfuric acid at elevated temperatures, e.g. 250° to 270°F, so that, in a 33°Be solution, each liter contains about 0.3 to 0.5 moles of free sulfuric acid.

EXAMPLE 3

To 100 ml of 33°Be ferric sulfate which contains 10-15 percent ferrous iron (total iron equivalent to 14.4 $Fe_2O_3$ per 100 ml) is added a slurry of 7.2 g of ZnO in 50 ml of cool water. The mixture is stirred at 60° until the zinc oxide goes into solution (about one-half hour). Next, with the temperature around 60°, 69 ml of 17.4 percent (20°Be) aqueous sodium carbonate solution is run in with stirring. Mixing is continued for about 1 hour to allow breakdown of precipitate clumps. The pH is maintained at about 5 by addition of the sodium carbonate solution. Next, the temperature is raised to 120° to 125° and the ferrous iron is oxidized with air. During the aeration step the pH is maintained near 6.5. The aeration is concluded in about 2 hours. At the end of the aeration, sodium carbonate solution is added to raise the pH to just over 7 and the pot is heated to 200° for 1 hour. The product is a light yellowish orange tan. A filter press is useful for the pulpy product. After water-washing and drying, the sulfate-free product is calcined at 1800° for one-half hour.

\* Samples taken from the pot are washed free of sulfate and calcined at 1400° for 15 minutes. When the sample calcines to a yellowish orange the ferrous iron is nearly all oxidized. The samples will calcine to a red orange if the ferrous iron is not fully oxidized.

EXAMPLE 4

The procedure of Example 1 is followed with the exception that, in place of the zinc oxide, 46.2 g of zinc carbonate are used.

What is claimed is:

1. A method of preparing yellowish zinc ferrite pigments having high temperature stability which comprises providing an aqueous slurry, at a temperature in the range of about 115° to about 130°F, containing an aqueous solution of ferrous sulfate and a zinc compound selected from the group consisting of zinc oxide and zinc carbonate, the weight ratio of the ferrous sulfate, calculated as $Fe_2O_3$, to the zinc oxide or zinc carbonate, calculated as zinc oxide, being in the range of about 70 to 65 $Fe_2O_3$ to about 30 to 35 zinc oxide, oxidizing said slurry with an oxygencontaining gas to effect at least substantially most of the oxidation of the ferrous iron to ferric iron while maintaining the reaction mixture at a pH in the range of about 5 to 6, then adding an alkaline material to increase the pH to not in excess of about 9.5, and continuing the heating, at a temperature not in excess of about 160°F to about boiling to effect coupling of the hydrous zinc oxide with the ferric oxide hydrate, washing to effect removal of substantially all water-soluble salts which may be present, and then calcining.

2. The method of claim 1, in which the zinc compound is zinc oxide, the oxidation is effected by means of air, and in which at least substantially most of the oxidation is effected at a temperature in the range of about 120° to 125°F.

3. The method of claim 2, in which the weight ratio of the ferrous sulfate, calculated as $Fe_2O_3$, to the zinc oxide is about 67 $Fe_2O_3$ to 33 zinc oxide.

4. The method of claim 2, in which the alkaline material is a member selected from the group of caustic alkalies, ammonia and alkali metal carbonates.

5. The method of claim 2, in which the alkaline material is an aqueous solution of sodium carbonate.

6. The method of claim 2, in which the calcining is effected at a temperature in the range of about 1350° to 1800°F.

7. A method of preparing yellowish zinc ferrite pigments having high temperature stability which comprises providing an aqueous slurry, at a temperature in the range of about 115° to about 130°F, containing an aqueous solution of ferrous sulfate and zinc oxide, the weight ratio of the ferrous sulfate, calculated as $Fe_2O_3$, to the zinc oxide being in the range of about 70-65 $Fe_2O_3$ to about 30 to 35 zinc oxide, aerating said slurry to effect oxidation of the ferrous iron to ferric iron while maintaining the reaction mixture at a pH in the range of about 5 to 6 by the addition of aqueous caustic alkali, then, when essentially all of the ferrous iron has been oxidized to ferric iron, adding aqueous caustic alkali to bring the pH to not in excess of about 8 and heating at a temperature of about 180° to 200°F to effect coupling of the hydrous zinc oxide with the ferric oxid4 hydrate, washing to effect removal of substantially all water-soluble salts which may be present, and then calcining.

8. The method of claim 7, in which at least substantially most of the oxidation is effected at a temperature in the range of about 120° to 125°F, and in which the weight ratio of the ferrous sulfate, calculated as $Fe_2O_3$, to the zinc oxide is about 67 $Fe_2O_3$ to 33 zinc oxide.

9. The method of claim 8, in which the calcining is effected at a temperature in the range of about 1350° to 1800°F.

10. A method of preparing yellowish zinc ferrite pigments having high temperature stability which comprises admixing an aqueous slurry of zinc oxide with an aqueous ferrous sulfate solution in which the weight ratio of the ferrous sulfate, calculated as $Fe_2O_3$, to the zinc oxide, is in the range of about 70 to 65 $Fe_2O_3$ to 30-35 zinc oxide, said mixture being heated at a temperature of about 115° to about 130°F, aerating said reaction mixture to oxidize the ferrous iron to ferric iron while maintaining the pH of said reaction mixture in the range of about 5 to 6 by the periodic addition of an aqueous alkali metal carbonate solution, then, when the oxidation of the ferrous iron to ferric iron has at least mainly been completed, raising the temperature of the reaction mixture to about 140° to 160°F to essentially complete the oxidation of the ferrous iron to ferric iron while maintaining the pH in the range of about 5 to 6 by the addition of an aqueous alkali metal carbonate solution, then increasing the temperature of the reaction mixture up to about 200°F while maintaining the pH in the range of about 7 to 8 by the addition of an aqueous alkali metal carbonate solution, separating the solids from the reaction mixture, washing said solids to remove the water-soluble salts therefrom, and calcining said washed solids.

11. The method of claim 10, in which the weight ratio of the ferrous sulfate, calculated as $Fe_2O_3$, to the zinc oxide is about 67 $Fe_2O_3$ to 33 zinc oxide.

12. The method of claim 11, in which the alkali metal carbonate is sodium carbonate.

13. The method of claim 12, in which the calcining is effected at a temperature in the range of about 1350° to 1800°F.

14. In a method of preparing yellowish zinc ferrite pigments having high temperature stability, the steps which comprise admixing an aqueous slurry of zinc oxide with an aqueous iron sulfate solution, the weight ratio of the iron in said iron sulfate, calculated as $Fe_2O_3$, to the zinc oxide being about 70 to 65 $Fe_2O_3$ to 30 to 35 zinc oxide, the zinc oxide largely dissolving in said solution, adding an aqueous alkali metal carbonate solution to produce a pH in said solution of about 5 to 6, aerating said solution at a temperature in the range of about 115° to 125°F while maintaining the pH at about 6 to 6.5 by the addition of an aqueous alkali metal carbonate solution whereby to effect substantially complete oxidation of the ferrous iron to ferric iron, then, after completion of said aeration, increasing the pH by the addition of an aqueous alkali metal carbonate solution to produce a pH in the range of about 7 to 8 and heating the reaction mixture at a temperature in the range of about 180° to 200°F, separating the solids from the reaction mixture, washing said solids to remove the water-soluble salts therefrom, and calcining said washed solids.

15. The method of claim 14, in which the aqueous iron sulfate solution is one in which ferric and ferrous iron are present and in which the ferric iron largely predominates.

16. The method of claim 15, in which the aqueous alkaline material is a solution of sodium carbonate.

17. The method of claim 16, in which the weight ratio of the iron, calculated as $Fe_2O_3$, to the zinc oxide is about 67 $Fe_2O_3$ to 33 zinc oxide.

18. The method of claim 17, in which the calcining is effected at a temperature in the range of about 1350° to 1800°F.

* * * * *